(12) United States Patent
Jimenez et al.

(10) Patent No.: US 9,968,219 B2
(45) Date of Patent: *May 15, 2018

(54) COFFEE MAKER

(71) Applicant: The Richards Corporation, Sterling, VA (US)

(72) Inventors: Marcos Jimenez, Charles Town, WV (US); Brad Beyer, Sterling, VA (US)

(73) Assignee: The Richards Corporation, Sterling, VA (US)

( * ) Notice: Subject to any disclaimer, the term of this patent is extended or adjusted under 35 U.S.C. 154(b) by 352 days.

This patent is subject to a terminal disclaimer.

(21) Appl. No.: 14/685,219

(22) Filed: Apr. 13, 2015

(65) Prior Publication Data

US 2015/0208857 A1 Jul. 30, 2015

Related U.S. Application Data

(63) Continuation of application No. 12/879,793, filed on Sep. 10, 2010, now Pat. No. 9,049,959.

(60) Provisional application No. 61/276,426, filed on Sep. 11, 2009.

(51) Int. Cl.
*A47J 31/057* (2006.01)
*A47J 31/56* (2006.01)
*A47J 31/44* (2006.01)
*A47J 31/46* (2006.01)
*A47J 31/40* (2006.01)

(52) U.S. Cl.
CPC ............ *A47J 31/56* (2013.01); *A47J 31/407* (2013.01); *A47J 31/44* (2013.01); *A47J 31/46* (2013.01)

(58) Field of Classification Search
CPC .......... A47J 31/407; A47J 31/44; A47J 31/46; A47J 31/462; A47J 31/465; A47J 31/56
USPC ............................................. 99/293
See application file for complete search history.

(56) References Cited

U.S. PATENT DOCUMENTS

| | | |
|---|---|---|
| 1,508,809 A | 9/1924 | White |
| 2,169,852 A | 8/1939 | Scott |
| 3,412,672 A * | 11/1968 | Herbsthofer .......... A47J 31/057 99/300 |
| 3,596,588 A | 8/1971 | Moss |
| 4,008,656 A | 2/1977 | Gruner |
| 4,630,532 A | 12/1986 | Sonnentag et al. |
| 4,949,627 A | 8/1990 | Nordskog |
| 5,207,148 A | 5/1993 | Anderson et al. |

(Continued)

FOREIGN PATENT DOCUMENTS

| | | |
|---|---|---|
| EP | 0267649 | 5/1988 |
| EP | 0387515 | 9/1990 |

(Continued)

OTHER PUBLICATIONS

PCT/US2010/049749 International Search Report and Written Opinion dated Dec. 14, 2010.

(Continued)

*Primary Examiner* — Quang D Thanh
*Assistant Examiner* — Brandon Harvey
(74) *Attorney, Agent, or Firm* — Kilpatrick Townsend & Stockton LLP; Dean W. Russell; Kristin M. Crall

(57) ABSTRACT

Embodiments of the present invention provide improved water fill capabilities, improved coffee baskets, and improved steam diverting and management features for coffee makers used on board passenger transport vehicles.

13 Claims, 20 Drawing Sheets

(56) References Cited

U.S. PATENT DOCUMENTS

| | | | |
|---|---|---|---|
| 5,463,932 | A | 11/1995 | Olson |
| 6,779,435 | B1 | 8/2004 | Iacobucci |
| 7,481,151 | B2 | 1/2009 | Van Der Meer et al. |
| 7,891,287 | B2 | 2/2011 | Miller |
| 2002/0050209 | A1 | 5/2002 | D'Antonio et al. |
| 2002/0116125 | A1 | 8/2002 | Lin |
| 2002/0116126 | A1 | 8/2002 | Lin |
| 2003/0003208 | A1 | 1/2003 | Lassota |
| 2004/0035197 | A1 | 2/2004 | Antonio |
| 2004/0186634 | A1 | 9/2004 | Lucky et al. |
| 2007/0051246 | A1 | 3/2007 | Suzuki |
| 2008/0084144 | A1* | 4/2008 | D'Ambrosio .......... A47B 88/49 312/137 |
| 2009/0219140 | A1 | 9/2009 | Guard et al. |
| 2011/0067575 | A1 | 3/2011 | Jimenez et al. |

FOREIGN PATENT DOCUMENTS

| | | |
|---|---|---|
| EP | 1369068 | 12/2003 |
| JP | 2000014540 | 1/2000 |
| WO | 2007106947 | 9/2007 |
| WO | 2011037952 | 3/2011 |

OTHER PUBLICATIONS

Office Action dated Aug. 13, 2012 in U.S. Appl. No. 12/887,796.
Response to Office Action dated Oct. 31, 2012 in U.S. Appl. No. 12/887,796.
Office Action dated Jan. 2, 2013 in U.S. Appl. No. 12/887,796.
Office Action dated Nov. 26, 2013 in U.S. Appl. No. 12/887,796.
Response to Office Action dated Feb. 26, 2013 in U.S. Appl. No. 12/887,796.
Office Action dated Apr. 11, 2013 in U.S. Appl. No. 12/887,796.
Office Action dated Jul. 9, 2014 in U.S. Appl. No. 12/887,796.
Office Action dated Jan. 8, 2016 in U.S. Appl. No. 12/887,796.
Restriction Requirement dated Jun. 14, 2012 in U.S. Appl. No. 12/879,793.
Response to Restriction Requirement dated Sep. 13, 2012 in U.S. Appl. No. 12/879,793.
Office Action dated Nov. 9, 2012 in U.S. Appl. No. 12/879,793.
Response to Office Action dated Feb. 8, 2013 in U.S. Appl. No. 12/879,793.
Office Action dated Apr. 15, 2013 in U.S. Appl. No. 12/879,793.
Response to Office Action dated Aug. 14, 2013 in U.S. Appl. No. 12/879,793.
Office Action dated Feb. 26, 2014 in U.S. Appl. No. 12/879,793.
Response to Office Action dated Jul. 15, 2014 in U.S. Appl. No. 12/879,793.
Office Action dated Sep. 18, 2014 in U.S. Appl. No. 12/879,793.
Response to Office Action dated Jan. 16, 2015 in U.S. Appl. No. 12/879,793.
Notice of Allowance dated Feb. 6, 2015 in U.S. Appl. No. 12/879,793.
Response to Office Action dated May 23, 2014 in U.S. Appl. No. 12/887,796.
Response to Office Action dated Nov. 10, 2014 in U.S. Appl. No. 12/887,796.

* cited by examiner

COFFEE MAKER

This application claims the benefit of U.S. Provisional Application Ser. No. 61/276,426, filed Sep. 11, 2009, titled "Coffee Maker," and U.S. Ser. No. 12/879,793, filed Sep. 10, 2010 titled "Coffee Makers," now allowed, the entire contents of each of which are hereby incorporated by reference.

FIELD OF THE INVENTION

Embodiments of the present invention relate generally to coffee makers, and specifically, to coffee makers for use on board passenger transport vehicles with space limitations. Specific embodiments are designed for particular use in aircraft galleys. Various embodiments provide water fill features, filter basket improvements, low water indication features, and steam management features.

BACKGROUND

In general, coffee makers used on board passenger transport vehicles, such as aircraft, are flush mounted in a cabinet or other opening. For example, such coffee makes are typically permanently housed or otherwise secured in place in a cabinet or opening that is shaped and configured to receive the coffee maker, so that the face of the coffee maker is mounted flush against the galley area. This provides particular advantages for space and safety considerations. A typical residential or office use coffee maker that sits on a countertop and plugs into an outlet is not suitable or appropriate for use on board a moving vehicle. In the event of turbulence or even a misplaced elbow or shove, a typical coffee maker can quickly become a projectile or present an electrical hazard to the user and passengers.

Accordingly, because coffee makers for use on passenger transport vehicles such as aircraft are flush mounted such that only the front surface of the coffee maker is visible and accessible, various common features must be substantially altered for safety and use considerations. For example, water filling is typically conducted via a direct connection to the aircraft or vehicle water supply. This is particularly the case with coffee makers mounted on board commercial aircraft, which are plumbed directly into the aircraft's potable water tanks. However, there may be some instances when the vehicle or aircraft water supply may be contaminated or suspect, such as when the aircraft reloads water in a country that has lower water inspection requirements. In these instances, the on-board coffee makers that are directly tied to the water system are unusable or their use can be a dangerous health hazard. There is not currently an appropriate solution to this problem.

Some models (particularly those for use on private jets) are designed as top fill models, which allow bottled water to be inserted directly into the top of the coffee maker. Top fill models used on vehicles are typically mounted below an empty or otherwise require specialized cabinetry that allow access to the top of the coffee maker or costly slide rails that allow translation of the entire coffee maker forward and aft to clear the cabinet and permit filling. Additional retention devices are also required to prevent inadvertent release of the equipment. Top fill coffee makers have limited use on board commercial aircraft due to space, time, and cabinetry considerations.

One attempted solution for commercial aircraft has been to provide an angled fill spout on the front or side of the coffee maker, into which bottled water can be poured directly. One problem with this design is that the spout also allows entry of dust and debris into the coffee maker. It also creates an extra protrusion on the face (or side) of the coffee maker, which can be detrimental when space is at a premium. The spouts can also only accept certain size bottles, limiting their use with water bottles of varying sizes. (For example, large mouth bottles would not work with such spouts.) Accordingly, an alternate solution for using bottled (or water from an external source) is needed.

Additionally, coffee makers for use on board passenger transport vehicles have other drawbacks that embodiments described herein seek to address. For example, coffee baskets that are used to hold coffee grounds are typically provided as a removable item, which can cause hazards as well as create hassles for use. Further, coffee makers used on board aircraft and other passenger transport vehicles create steam, which is particularly undesirable in these instances. Steam generation can be a particular concern when the water used in the coffee maker is not delivered directly via the pressurized water system on board a vehicle or internally generated via pump Thus, various steam management (e.g., reducing, removing, or diverting) features are needed and are described herein.

BRIEF SUMMARY

Embodiments of the present invention provide improved water fill capabilities, improved coffee baskets, and improved steam management features.

Specific embodiments provide a coffee maker configured for use on board a passenger transport vehicle, comprising: a water fill drawer, a track system on which the water fill drawer cooperates, and a secure closure system. The water fill drawer may cooperate with the track system at a downward angle such that water entering the water fill drawer is directed via gravity back toward a water reservoir of the coffee maker. The coffee maker may also feature various steam ducts.

Further embodiment provide a coffee maker configured for use on board a passenger transport vehicle, comprising: a coffee basket, a track system, and a rotating hinge. The coffee basket may be configured to be pulled horizontally out on the track system and rotated sideways on the rotating hinge.

Further embodiments provide a coffee maker configured for use on board a passenger transport vehicle, comprising: a lower water sensor system configured to sense a low water condition and activate a shut off feature. The low water sensor system may be a low water float.

A further embodiment relates to a coffee maker configured for use on board a passenger transport vehicle, comprising a drip stop valve comprising one or more curved levers.

Even further embodiments provide a coffee maker configured for use on board a passenger transport vehicle, comprising a coffee basket used in conjunction with an insert, the insert comprising an injector configured to contact a coffee bag and deliver water thereto.

DETAILED DESCRIPTION

Embodiments of the present invention provide coffee makers designed for particular use on board passenger transport vehicles and/or other instances where space is limited. Various embodiments of coffee makers described herein are capable of using one or more alternate water sources.

The described embodiments are particularly useful for coffee makers that are flush mounted in a galley and to which access to areas other than the face or front of the coffee maker is limited. Unlike a residential or commercial coffee maker, there is traditionally no access to the top or sides of an aircraft (or other passenger vehicle) coffee maker. For example, catering equipment is normally installed in the aircraft galley in close fitting compartments. Current aircraft coffee makers are thus designed to operate with potable water supplied by the pressurized water system on the aircraft, delivered directly to the coffee maker from the rear of the unit, where the coffee maker communicates directly with the on-board water supply.

Figure 1:
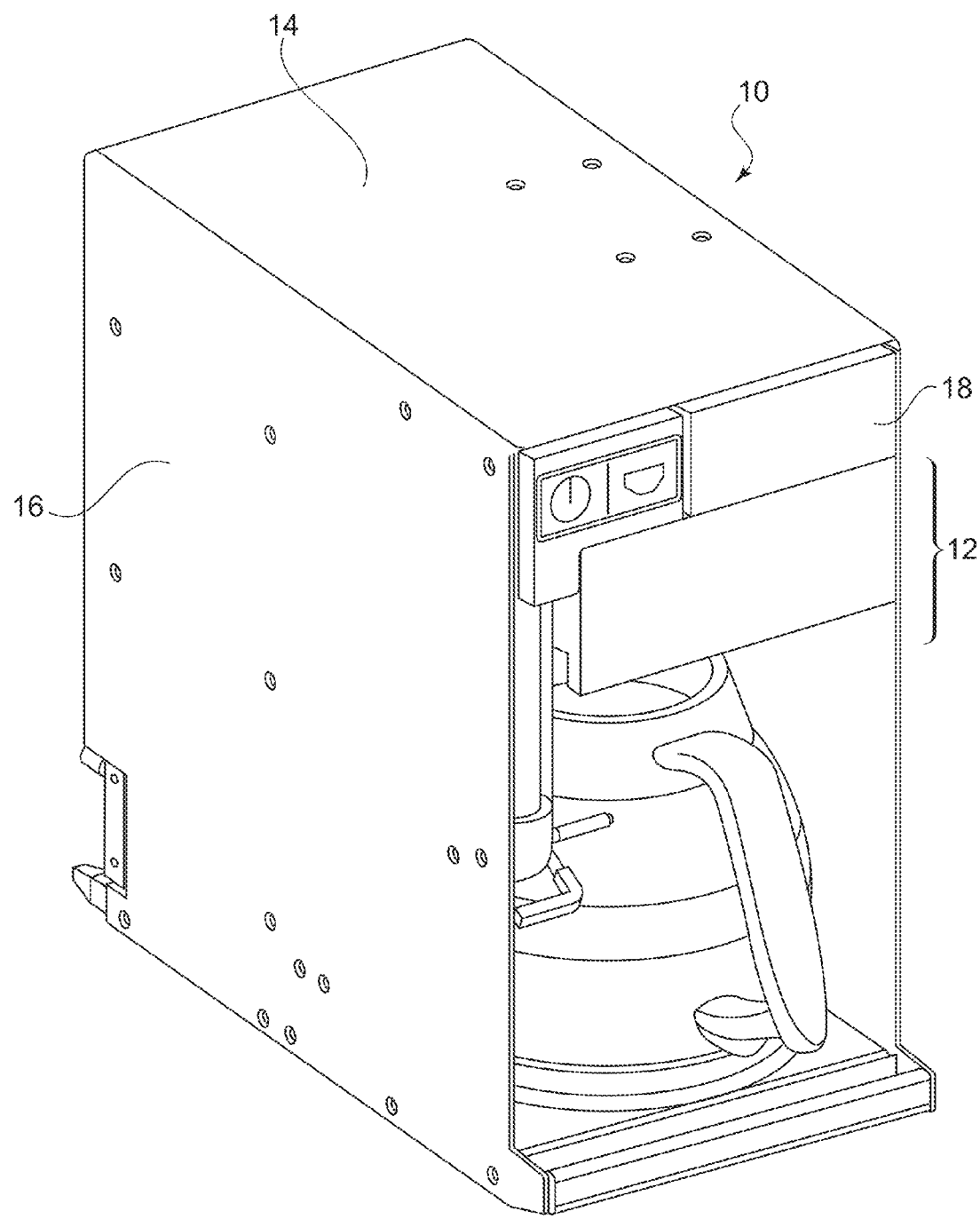
FIG. 1 shows a front perspective view of one embodiment of a coffee maker featuring a front water fill drawer.

As shown in FIG. 1, a coffee maker 10 that is designed to be flush mounted will only allow access to the front surface 12 of the coffee maker. The top 14 and side surfaces 16 are all designed to be mounted in cabinetry or other closed openings, and are thus inaccessible during use. Coffee maker 10 is thus provided with a water fill drawer 18 on its front surface 12. Water fill drawer 18 is configured to be directly accessible from the front surface 12 of coffee maker 10.

Figure 2:
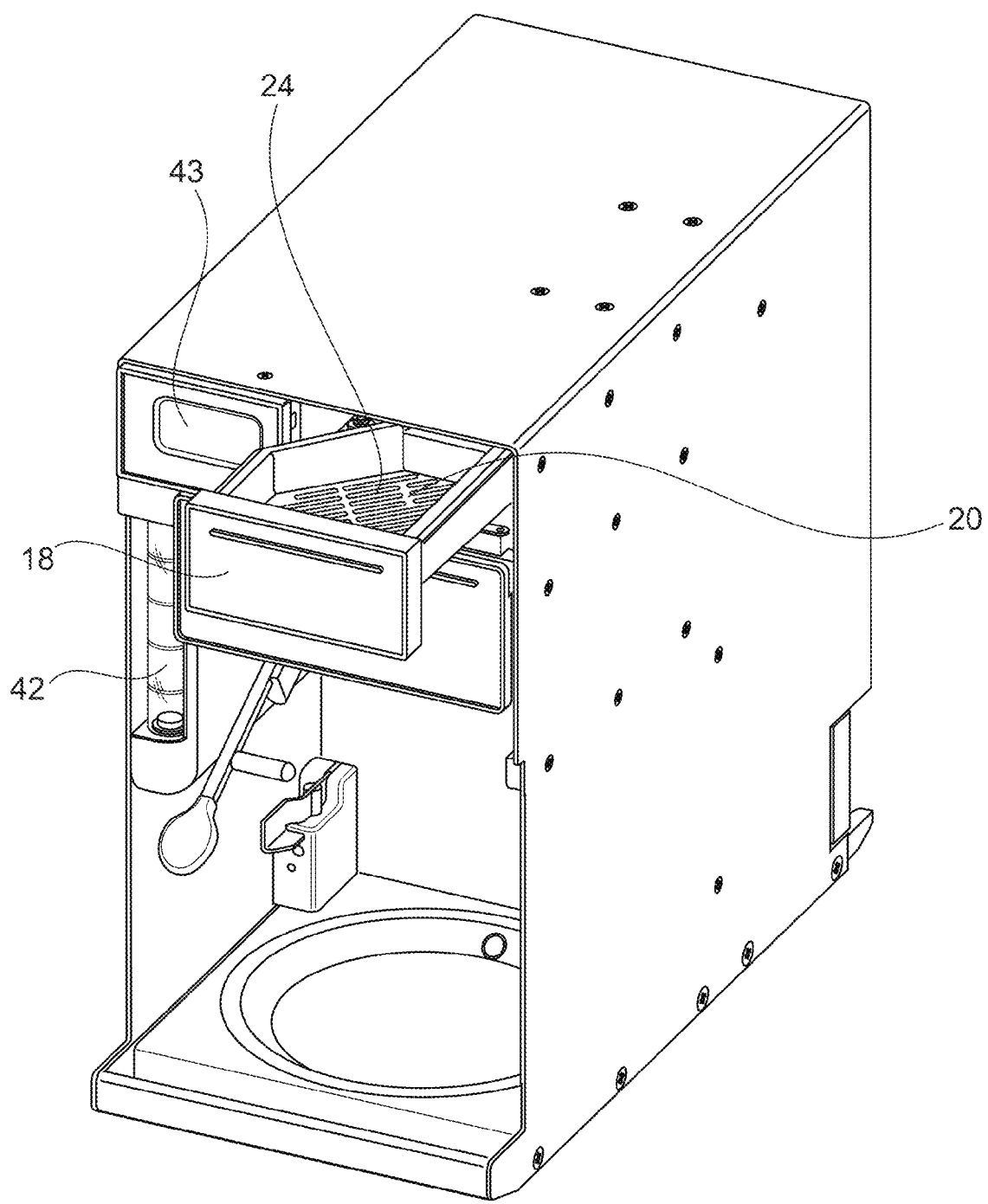
FIG. 2 shows a front perspective view of the coffee maker of FIG. 1 with the water fill drawer in an open position.
Figure 3:
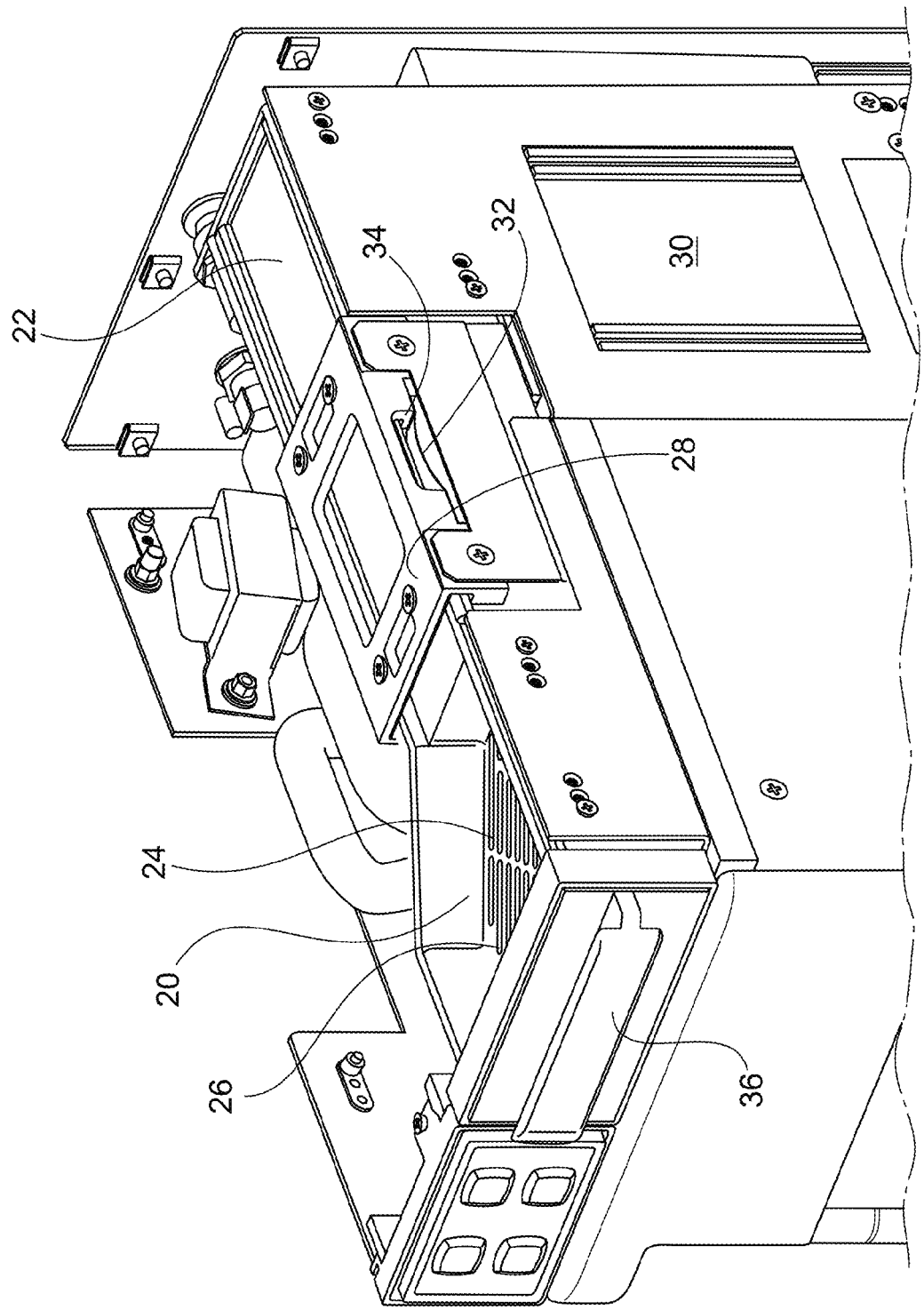
FIG. 3 shows a side perspective cut away view of the coffee maker of FIG. 1.

As shown in FIG. 2, water fill drawer 18 is intended to open directly outwardly from the front surface 12 of coffee maker. It allows direct access to the coffee maker for adding bottled water, filtered water, or other water from an outside source directly into the coffee maker, and provides an alternative to using the vehicle's internal water lines to supply the water. As shown in FIG. 3, water fill drawer 18 has a water receiving portion 20 and a drawer portion 22. Water receiving portion 20 is shown having an optional grate 24 positioned therein, which is intended to prevent foreign articles from being introduced into the coffee maker. Grate 24 has openings 26 through which water is allowed to pass. The bottom part of drawer 18 is, of course, a solid portion without openings such that water poured into drawer 18 is contained therein.

Water fill drawer 18 is mounted on a track system 28. In certain embodiments, water fill drawer 18 is mounted at a slightly backward or downward angle (e.g., higher at the front surface of the coffee maker and lower at the rear portion), such that water poured into the drawer 18 will flow back to water chamber or reservoir 30 via gravity.

Figure 4:
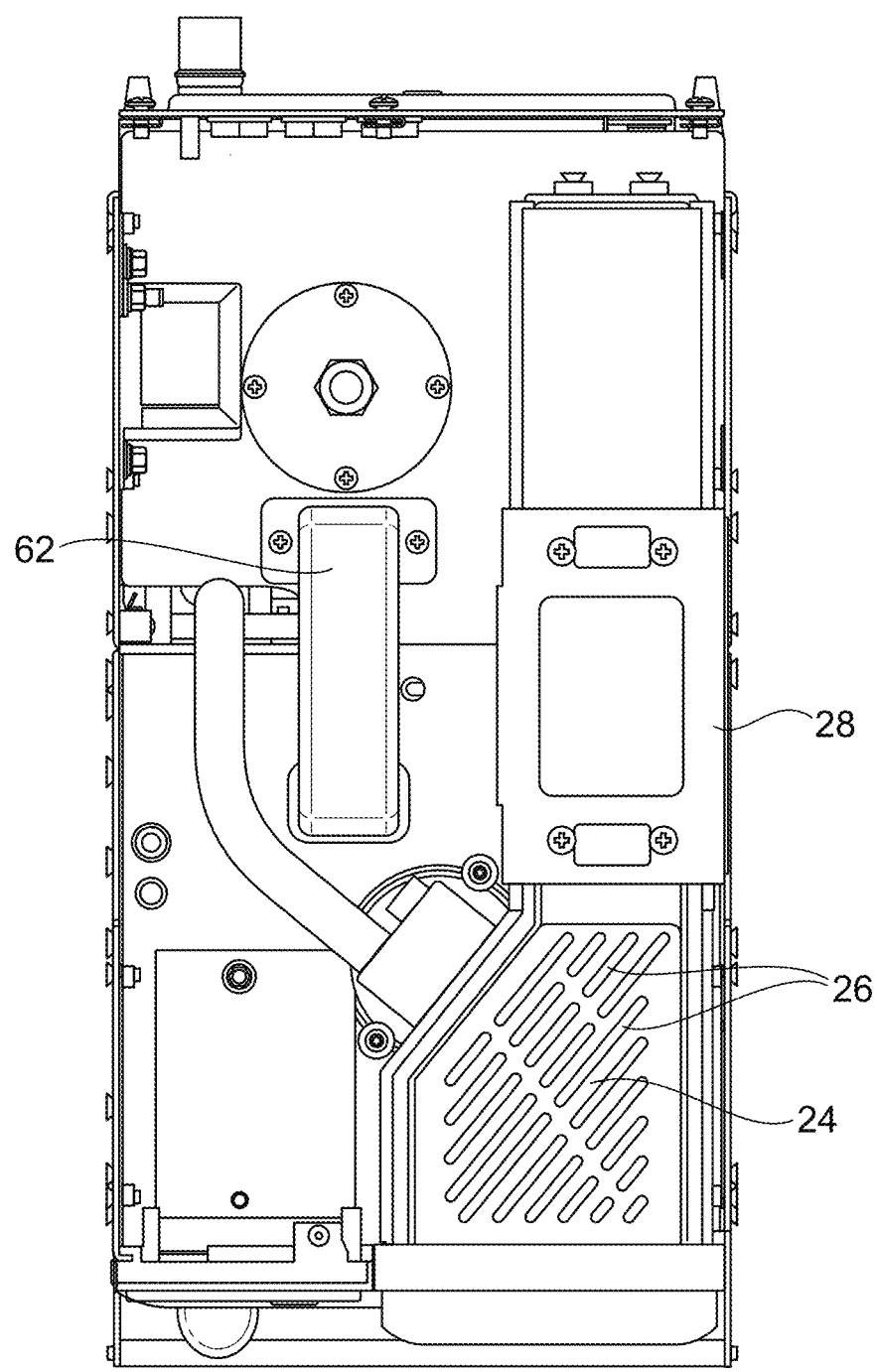
FIG. 4 shows a top plan view of one closure mechanism for a water fill drawer.
Figure 18:
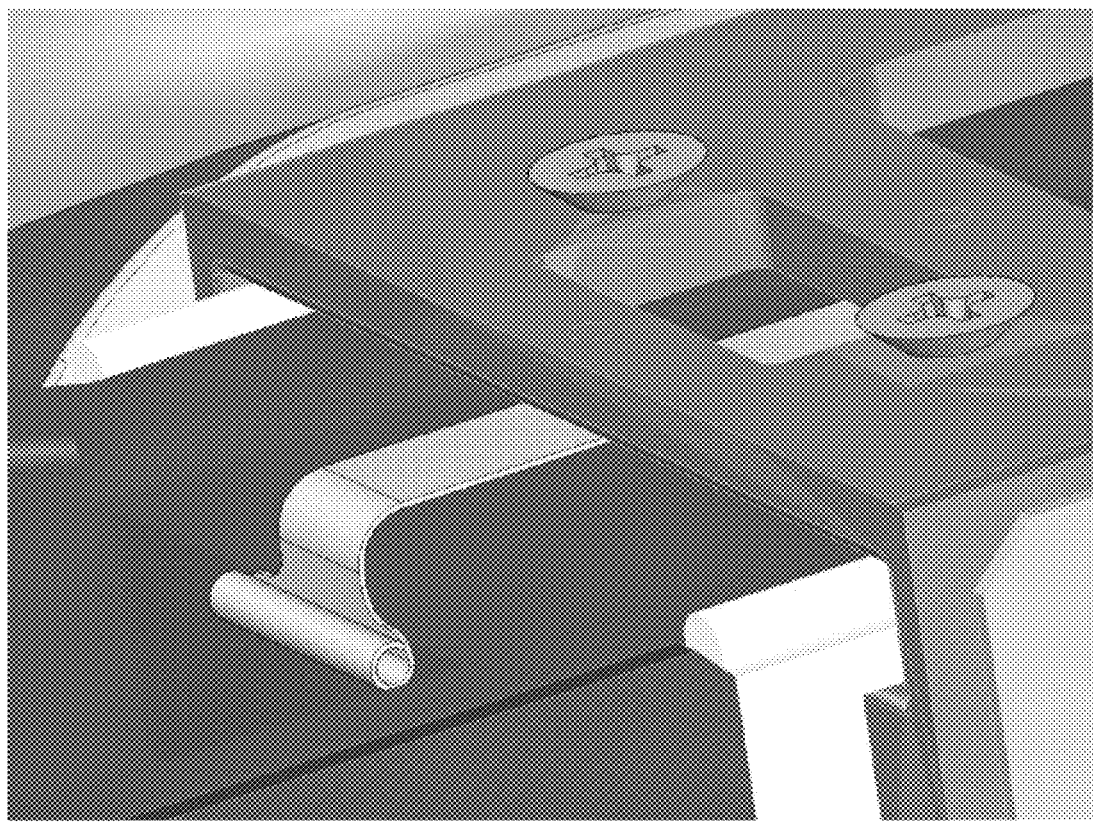
FIG. 18 shows a side perspective view of an alternate latch mechanism for the water fill drawer.

The drawer portion 22 of the water fill drawer 18 has a secure closure system, such as a latch that will keep drawer closed and secured when not in use. In the embodiment shown in FIG. 3, latch is shown as a spring/detent feature 32 that cooperates with a corresponding stop 34 on the track 28. The spring portion 32 has a large radius so that as the drawer 18 is being pushed back into place, the spring 32 draws the drawer 18 closed. Cooperation between the spring 32 and the stop 34 may create a click sound, indicating that the drawer 18 is fully closed. FIG. 4 shows a top view of the drawer in a fully closed position. Any type of spring latch may be used. One example of an alternate latch is shown in FIG. 18, which illustrates an angled securing flat spring latch made out of tempered steel that cooperates with a portion of the drawer. Drawer 18 may also be provided with an external handle 36 that the user grasps, pushes, or pulls in order to activate the drawer 18.

Figure 5:
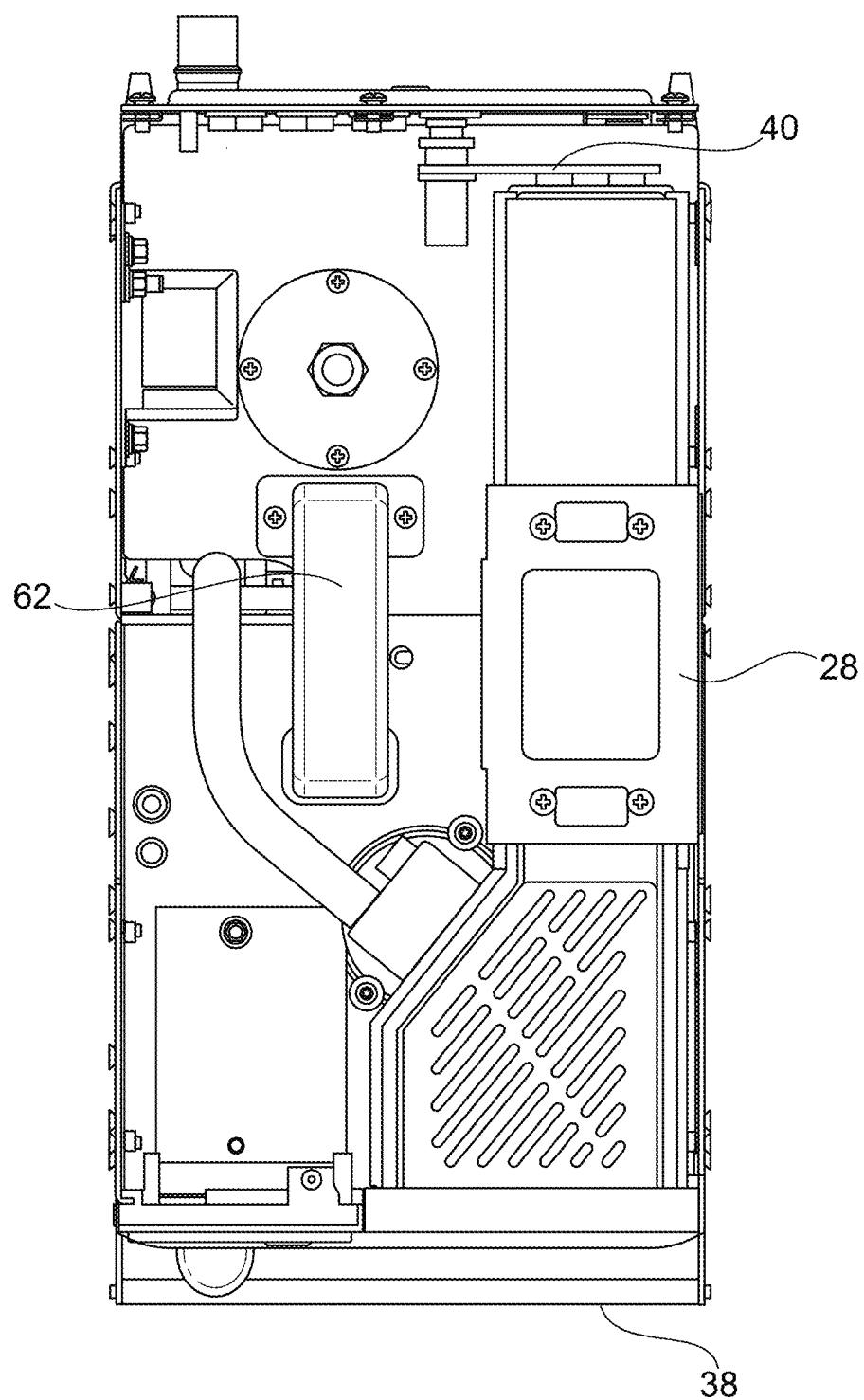
FIG. 5 shows a top plan view of an alternate closure mechanism for a water fill drawer.

In an alternate embodiment, the drawer 18 may be designed as a push/push drawer. The push/push embodiment does not require an external handle, because the user can simply press on the external surface 38 of drawer 18. As shown in FIG. 5, when a user presses on the drawer 18 from a closed position, a push/push latch 40 located on an internal rear portion of the coffee maker springs in and presses the drawer 18 out. After water has been added, the user presses the drawer back in, and the push/push latch 40 secures the drawer 18 in place.

One of the benefits of water fill drawer 18 being provided as a sliding drawer that slides completely into the coffee maker after water has been added is that it remains covered during the coffee making process in use, preventing the introduction of dust or other contaminants into the coffee maker water reservoir 30. Additionally, the design allows the front surface of the coffee maker to have a sleek appearance, free of spouts or other external water source insertion features that have been provided on other attempted solutions.

An additional feature that various embodiments of coffee makers described herein may have is a dual fill capability. As discussed above, traditional coffee makers installed on board aircraft are plumbed into existing water lines on board the aircraft in order to fill. Specifically, a button on the front of the coffee maker is activated and the system pulls from the hot water tank(s) in order to provide pressurized water that is forced through the system for brewing a full pot of coffee. There is not currently a feature provided that allows an attendant to manually control how much water is delivered to the coffee maker or to choose to fill the coffee maker with bottled water or water from an external water source. Thus, in certain embodiments, coffee maker 10 may be configured with a water fill drawer 18, allowing the use of an external water source, as well as a system that allows an attendant to use existing aircraft or vehicle water tanks to fill the coffee maker.

Figure 11:
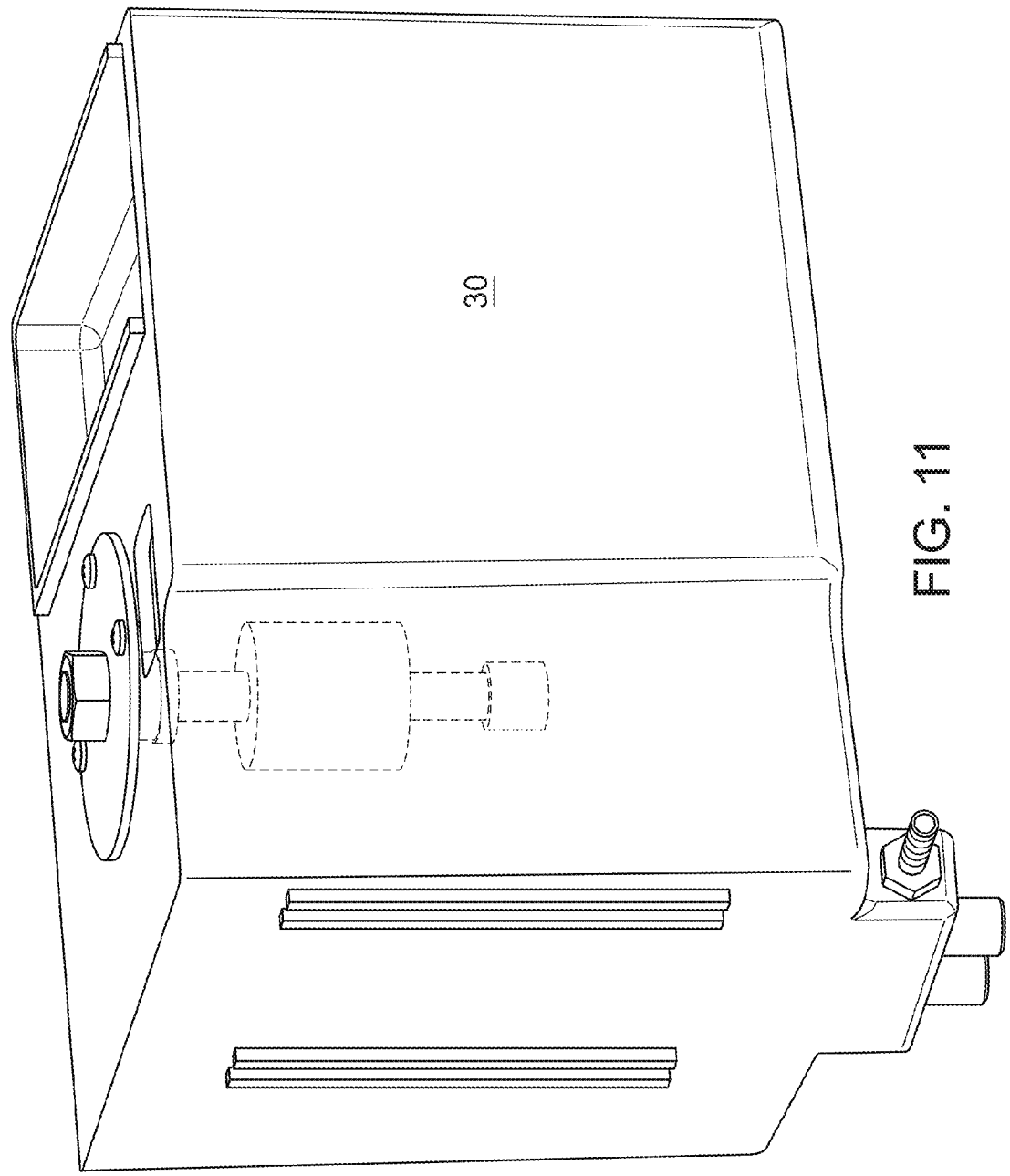
FIG. 11 shows one embodiment of a water sensor system.

In a specific embodiment, there is a sight gauge 42 provided on the front of coffee maker. There is also a control mechanism 43 (such as a button, lever, or switch) that allows an attendant to cause the coffee maker to fill with water from the aircraft water tanks, but allows the attendant to manually determine the amount of water to be used. For example, an attendant may only wish to brew half of a pot of coffee. In the past, the pre-plumbed systems have always pulled the same pre-determined amount of water into the coffee maker, making this impossible. The present design allows the attendant to either fill the coffee maker with the desired amount of water using water fill drawer 18 or to activate control mechanism 43 and only fill to a desired level. This allows for brewing less than a full pot of coffee at a time. The control mechanism can either be a push-and-hold system that is pressed to fill (and released to stop filling) or it can work with a single push, which will indicate to the system to automatically fill to a certain capacity. In either embodiment, one back-up mechanism to prevent overfilling is shown in FIG. 11, which illustrates a system that indicates to the coffee maker that the water reservoir is full. This system may either be in the form of a float system or any other mechanism that is designed to indicate a specific water level.

Figure 6:
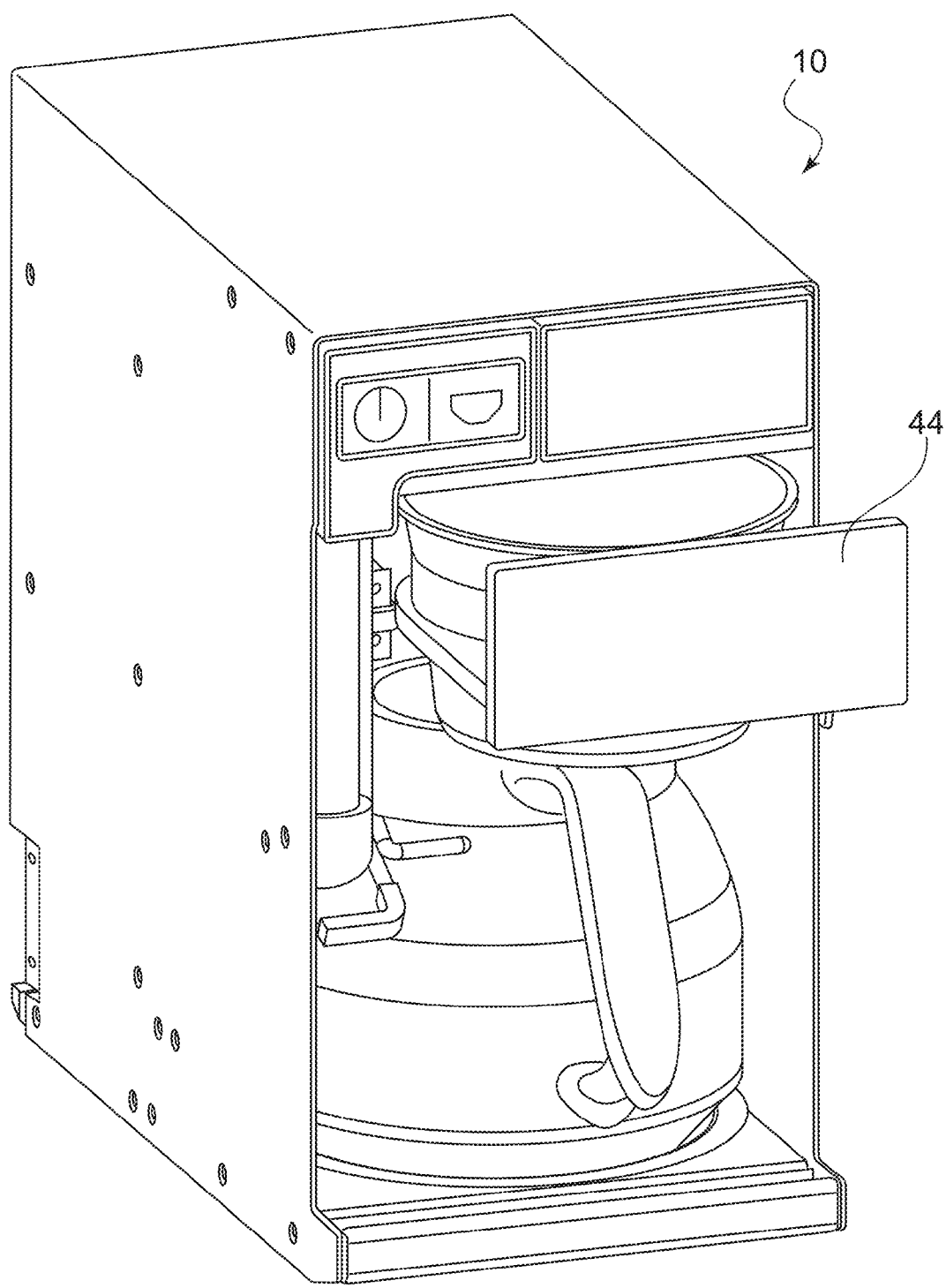
FIG. 6 shows a side perspective view of one embodiment of a coffee maker featuring a secured coffee basket.
Figure 7:
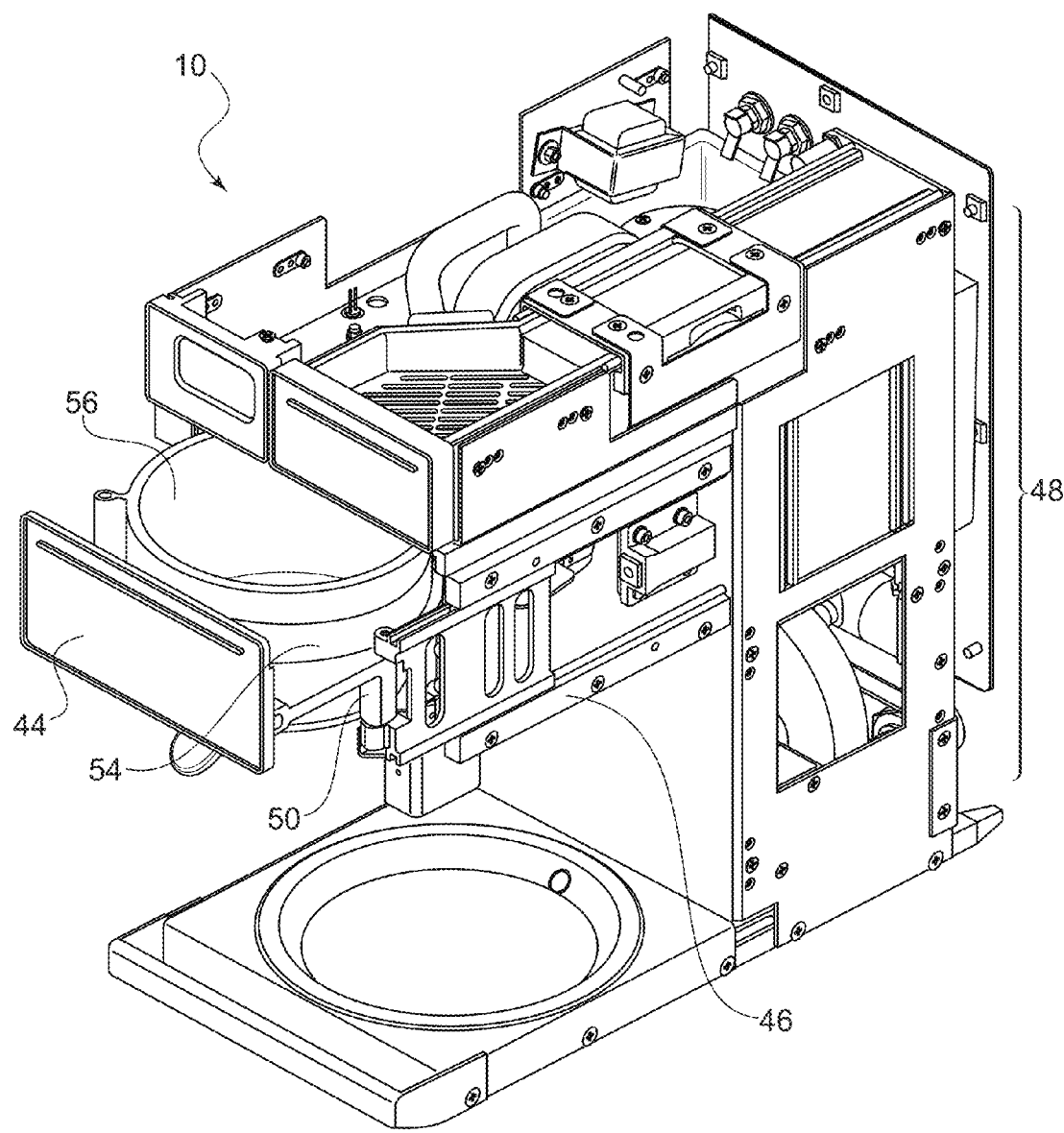
FIG. 7 a side perspective cut away view of the coffee maker of FIG. 6.
Figure 8:
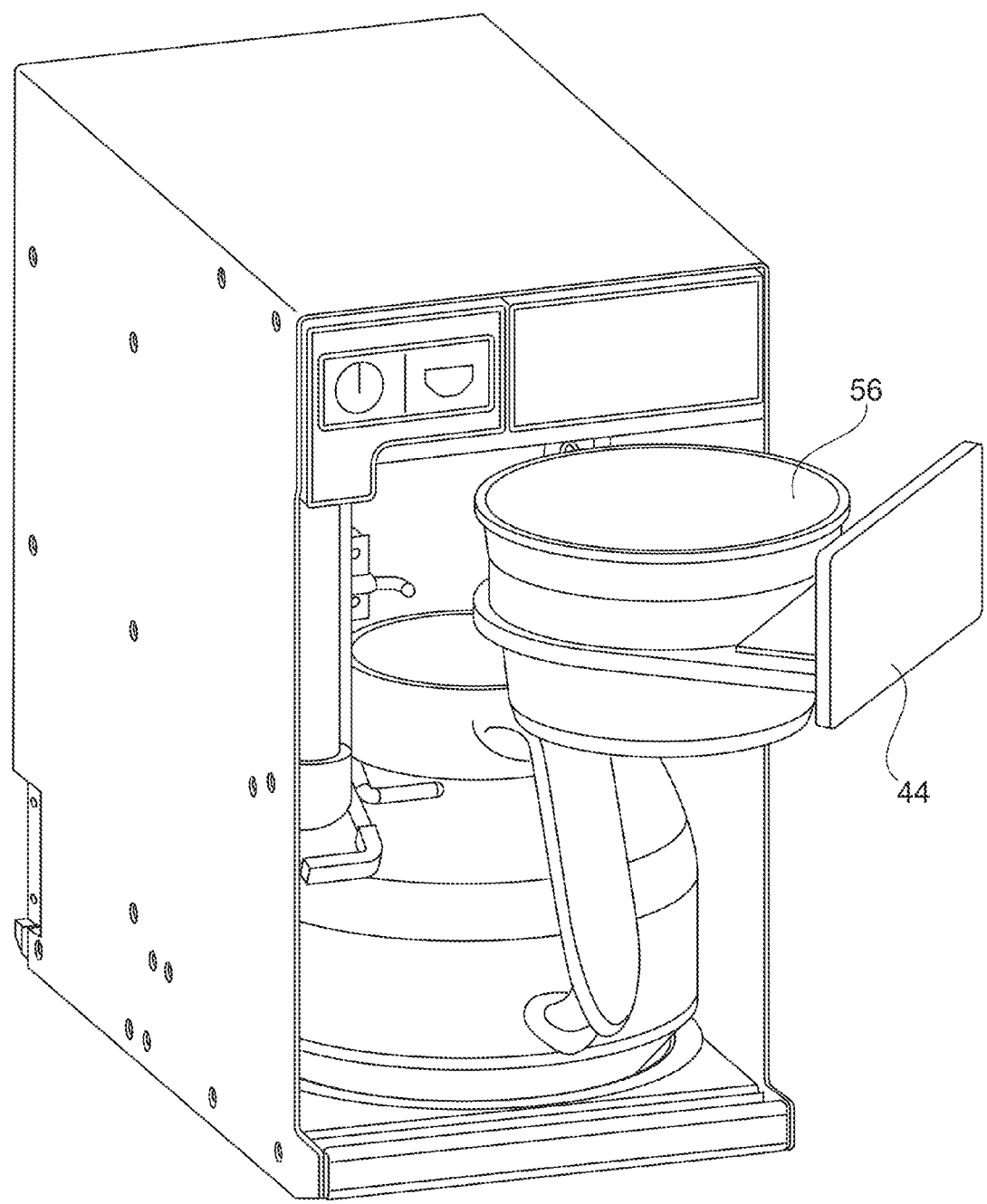
FIG. 8 shows a side perspective view of a coffee maker with the coffee basket rotated out to the side.

A further improvement provided herein relates to coffee baskets designed for use on board passenger transport vehicles, such as an aircraft. FIGS. 6-8 show embodiments of a coffee basket 44 that is designed to be permanently attached to the coffee maker 10. Current on-board coffee maker designs provide coffee baskets (also known as a brew cup or brew tray) that are removable or provided as a loose item, inserted into the equipment from the front and pushed rearward. Airline standards require that loose items have dual retention mechanisms in order to keep them stowed and to prevent them from becoming a projectile in the event of turbulence. This can add to the expense of manufacturing such features. It is also inconvenient to have the entire basket be a removable item in a small galley space.

Accordingly, the coffee basket 44 shown in FIG. 7 is designed to be permanently secured to the coffee maker. It cooperates against or otherwise slides on a permanent track 46 on coffee maker 10. Track 46 is provided along one side 48 of coffee maker, although it should be understood that two tracks (one alongside each side of coffee maker) may also be provided. Tracks 46 keep the coffee basket 44 secured inside the housing, preventing the need for any additional retention mechanisms. As discussed above with respect to the water fill drawer, coffee basket 44 may either be provided with a handle that can be pulled out and pushed in, with an accompanying locking feature, or may be provided with a push/push latch, which allows the basket 44 to extend from the coffee maker and be secured flush against the coffee maker by a user's push. With either option, the brew basket 44 is securely retained in place, and it is always connected to the coffee maker housing.

Coffee brew basket 44 may additionally be provided with a rotating hinge 50, which is designed to allow an extended coffee basket 44 to rotate or swing out to one side in order to allow clear access to basket 44. In use, coffee basket 44 slides out as far as possible on the track(s) 46, and is then rotated to the side. This allows the track to extend the coffee basket out to its the complete length, and then the hinge provides the remainder of the clearance. Alternatively, the track may be lengthened with an extension arm so that it provides a telescoping motion to extend so far out that the hinged rotation is not needed to provide clear access to the basket 44.

The resulting system is generally a two-piece design featuring the coffee basket 44, which is securely connected to the coffee maker 10 and which has an opening 54 therein to receive a filter basket portion 56. The filter basket portion 56 is generally removable and is designed to either hold a separate coffee filter (e.g., a paper filter) or to provide a reusable coffee filter itself. In use, the filter basket portion 56 is filled with coffee grounds, lowered into the opening 54 of the coffee brew basket 44, and the completed assembly is moved or swung closed.

Figure 9:
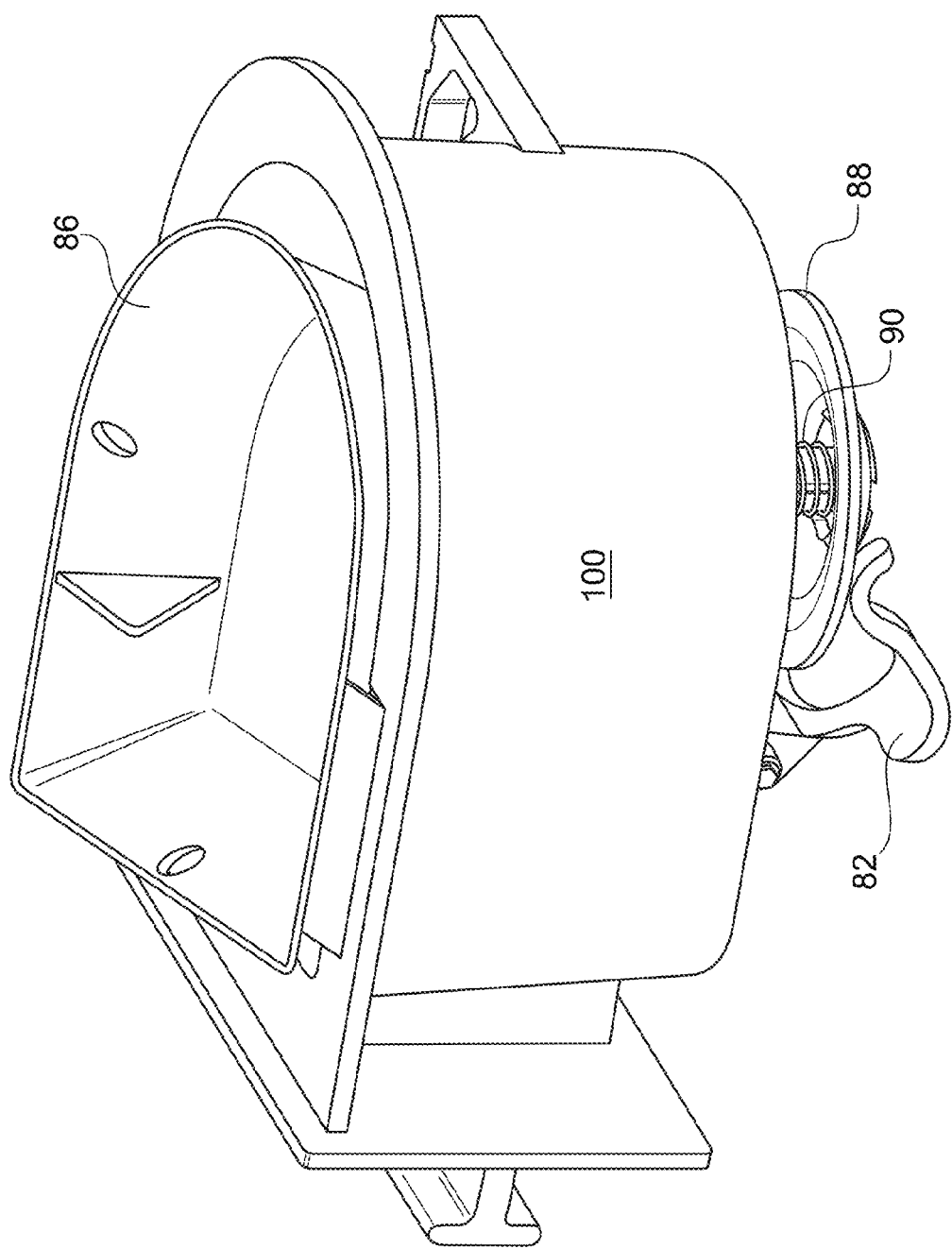
FIG. 9 shows an alternate embodiment of a coffee basket having an insert portion.
Figure 10:
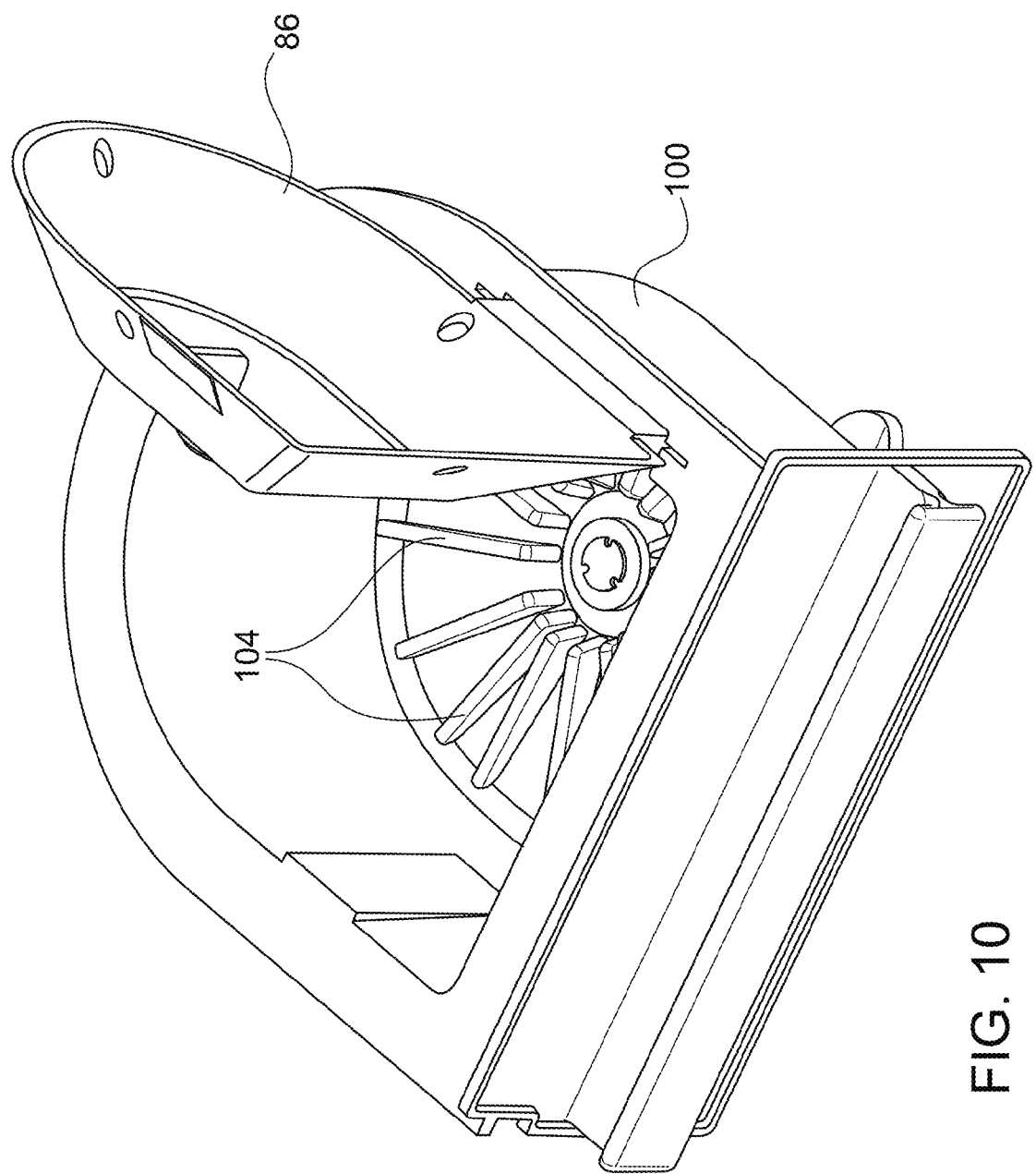
FIG. 10 shows an alternate view of the coffee basket of FIG. 9

A further feature that may be provided on various coffee makers described herein is a coffee basket that is specifically designed to brew coffee using coffee-filled bags instead of coffee grounds. Many airlines purchase coffee grounds that are pre-packaged in bags. Pressurized coffee makers generally provide enough pressure so that water enters pores of the bag and brews an acceptable pot of coffee. However, if the coffee maker does not use a pressurized system (such as the external fill embodiments described herein), the coffee resulting from the use of such bags may be too weak because water does not fully penetrate the bag. Accordingly, one coffee maker embodiment provides a basket 100 having an insert portion 86 that, in one embodiment, is hinged or is otherwise configured to and rotate or fold up and out of the basket 100. Examples of the cooperation between the insert portion 86 and the coffee basket 100 are shown in FIGS. 9 and 10.

Figure 19:
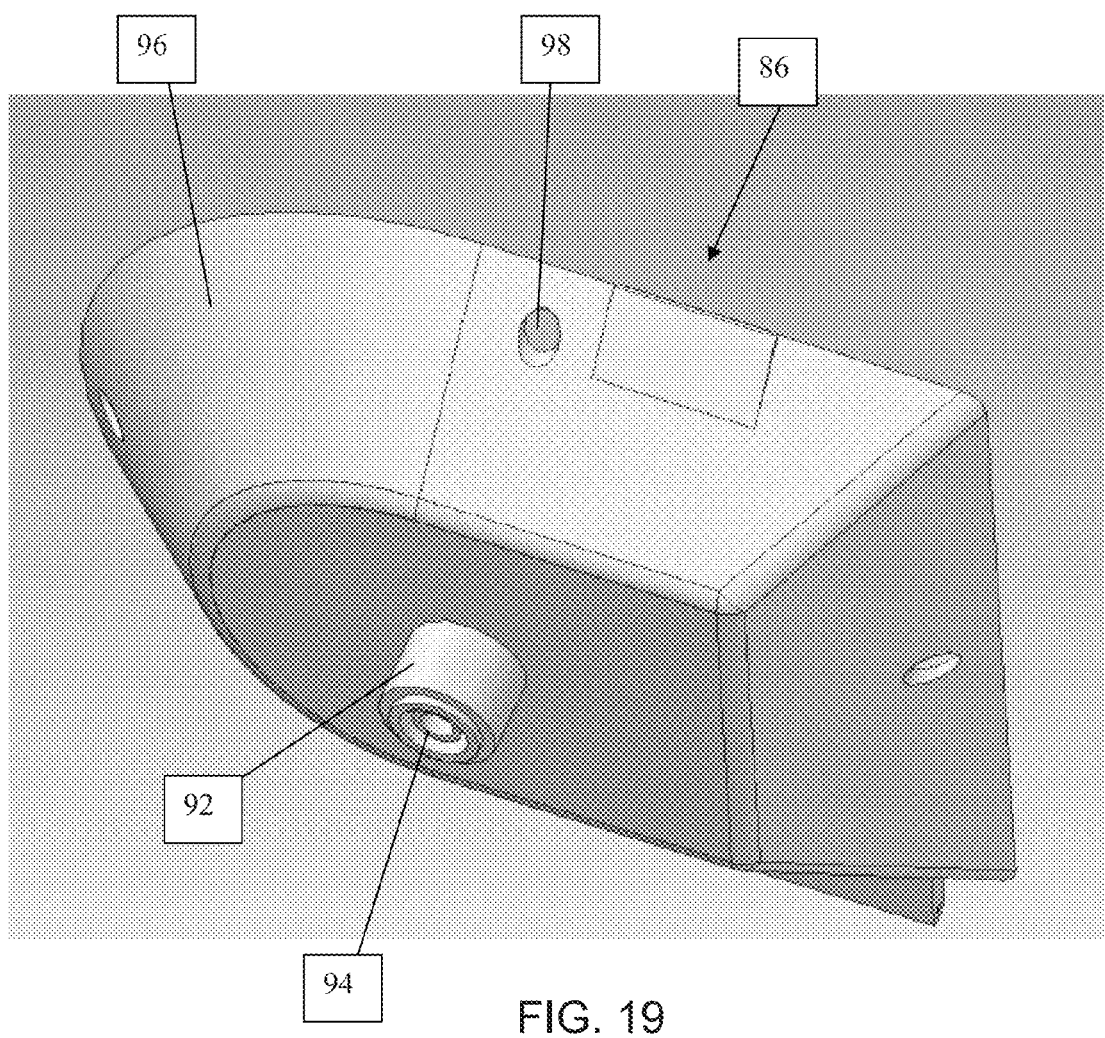
FIG. 19 shows a side view of one embodiment of a coffee basket insert.

As shown in FIG. 19, insert portion 86 has an injector 92 positioned on its lower surface. Injector 92 is designed to press against the surface of a coffee bag in order to ensure that water flows directly into the bag. Injector has a slightly recessed water release portion 94. In use, the outer perimeter of the injector 92 presses into the coffee bag and creates a small space between the perimeter and the recessed water release portion 94. Insert 86 also features angled surfaces 96. It is believed that these angled surface provide space for the coffee bag to expand during the brewing process. One or more holes 98 may also be provided at or near the upper edge of the insert 86, which allows any excess water in the insert 86 to drain out and into the coffee basket 100, preventing the insert from overflowing.

Figure 20:
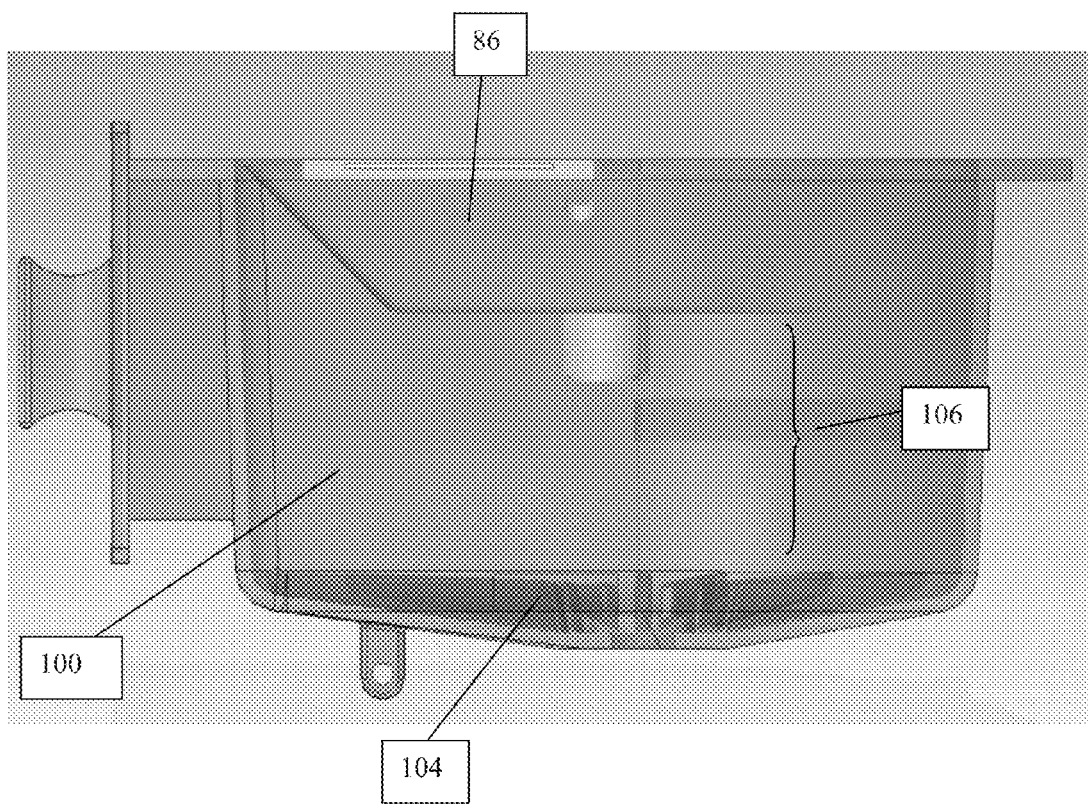
FIG. 20 shows a side view of a coffee basket having protrusions.

Referring now to FIG. 20, basket 100 also features one or more protrusions 104 (also shown ion FIG. 10) that extend up from the base of the basket, which form valley spaces therebetween to allow coffee to drain. A coffee bag may be placed in the space 106 between the protrusions 104 and the insert 86, which helps ensure the coffee bag is in appropriate contact with the water flowing through the system. Various examples of such baskets and insert portions are shown in FIGS. 9-10 and 19-20. It should be understood that these features may be used alone or in conjunction with other features described herein.

A further feature provided by various embodiments of the coffee makers described herein is a low water float switch. One of the shortcomings of traditional on-board coffee makers is that when the reservoir is emptied, there is a certain amount of steam that is generated as the last bit of water is boiled out of the coffee maker heater. This is particularly undesirable on an aircraft or other passenger transport vehicle because the appearance of steam in an aircraft galley can cause passenger concern, can generate unnecessary heat for those in close proximity, can increase the possibility of user burns, and is a waste of valuable energy. Accordingly, various embodiments of the coffee makers described feature a low water sensor system.

Figure 12:
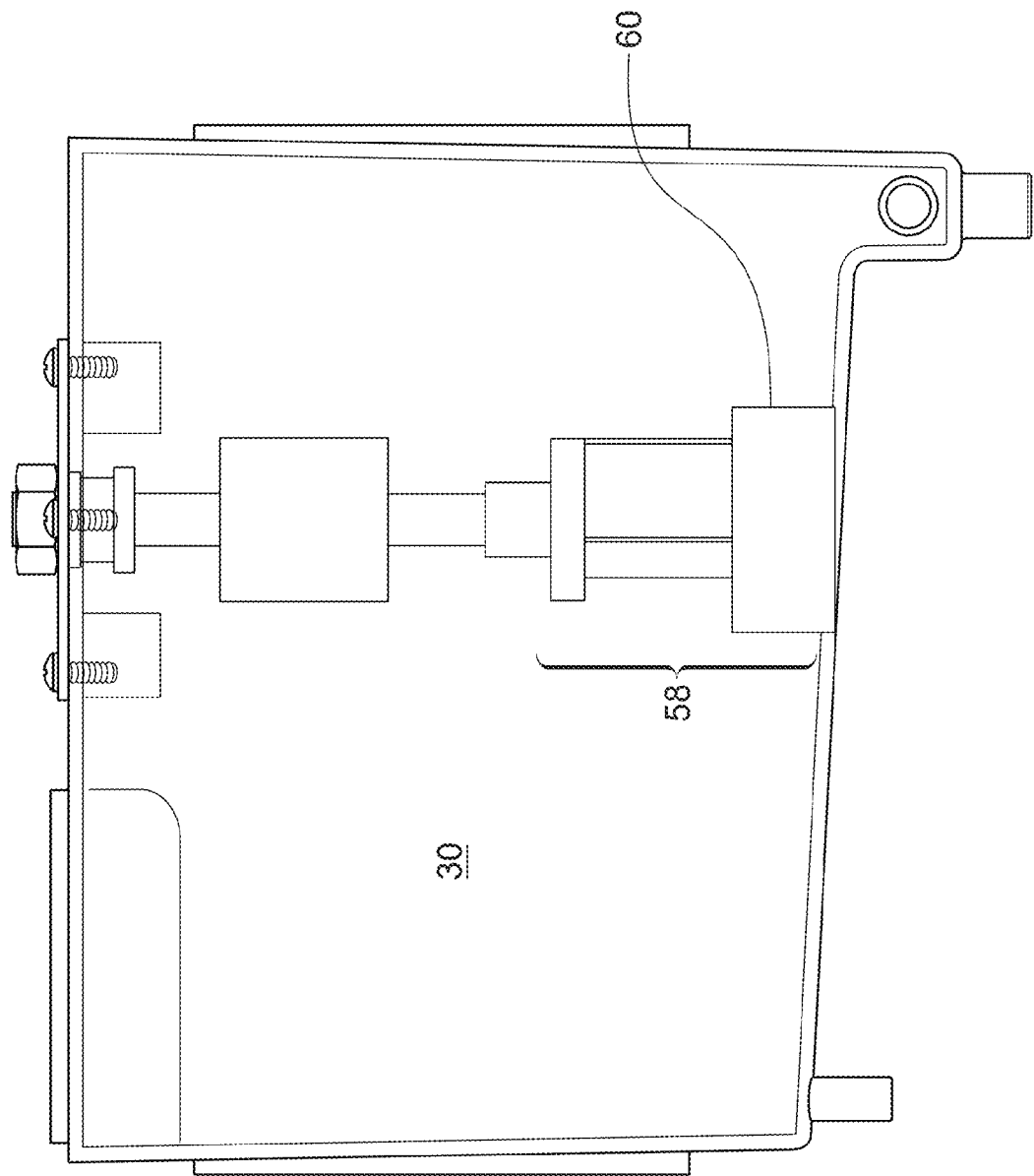
FIG. 12 shows one embodiment of a low water sensor system.

As shown in FIG. 12, a low water sensor system 58 may be located inside the water reservoir 30. Low water sensor system 58 is designed to anticipate the end of the brew cycle and to allow the coffee maker to cool down and/or stop just as the brew cycle is finishing. The system can be set by the user or pre-configured with factory settings to detect low water or a specific water level in the reservoir. When triggered by the low water level, the system automatically stops the cycle and turns off the heater upon reaching the specified water level. Rather than having to overheat in order for the thermostat to activate and shut the coffee maker off, the low water sensor system design enables conservation of energy and prevents unwanted and unnecessary dissipation of heat and steam.

In the embodiment shown, low water sensor system 58 may feature a low water float 60 that is configured to indicate the presence of low water, which triggers the system to shut off the coffee maker heater once the water level reaches a certain low point. The float 60 is initially positioned in a high (or full) position in the reservoir 30 when the reservoir is full or when a minimum amount of water is present. When the float 60 is in the high position, the coffee maker may be in a "ready" or "brew" position. As the water level in the reservoir 30 moves down, the float 60 moves down with the water level (although in some embodiments, the overall distance that float moves can be very small). Once the water and the float 60 reach a certain point (e.g., one inch of water left in the water reservoir or some other appropriate low level in the reservoir), the system sends a signal to the coffee maker heater to turn off. This allows the system to finish brewing with the remaining available water and complete the brew cycle before overheating and generating additional steam.

The low water sensor system 58 may alternatively be a conducting sensor, an infrared sensor, an ultrasonic sensor, or any other system that can detect a water level and send a related signal to the coffee maker circuitry to shut off once a certain water level is reached.

The lower water sensor system acts as a low water detector, and accordingly, it may also be used to prevent a user from turning on the coffee maker with an empty or low water tank. This system can eliminate the need for heater thermostats.

A further feature that may be provided by various coffee maker embodiments described herein is a steam management or diversion feature. As discussed above, the presence of steam in an aircraft galley can be disconcerting and uncomfortable. As such, various embodiments described herein are designed to remove excess steam from the brew tray and direct is elsewhere in the system.

In one embodiment, coffee maker 10 is provided with one or more steam ducts 62 configured to trap steam that builds up in the brew tray and direct it back to the water reservoir 30. The reservoir 30 initially holds cold water for brewing, but once the brewing cycle is complete, the reservoir is empty (or at least, no longer completely full). An example of one embodiment of a steam duct 62 is shown in FIGS. 4 and 5. The duct 62 captures steam before it leaves the coffee maker 10 and re-routes it back to the reservoir 30 (although it should be understood that it is also possible for steam ducts to re-route steam back to other areas of the coffee maker or to other ducting systems on board the vehicle). The generated and re-routed steam is allowed to condense in the water reservoir 30 so that at least most of the steam that would have otherwise been ejected from the system into the galley or the area external to the coffee maker is captured and reused.

Figure 13:
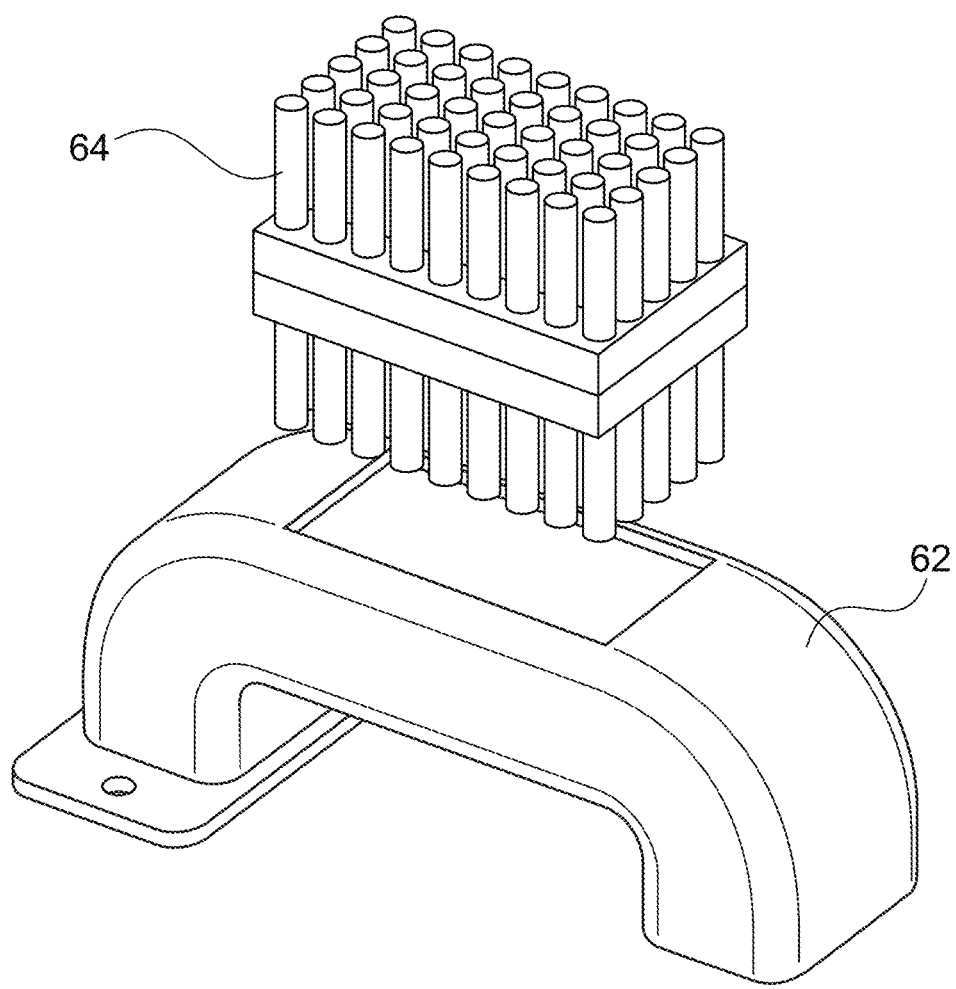
FIG. 13 shows an alternate embodiment of a steam duct.
Figure 14:
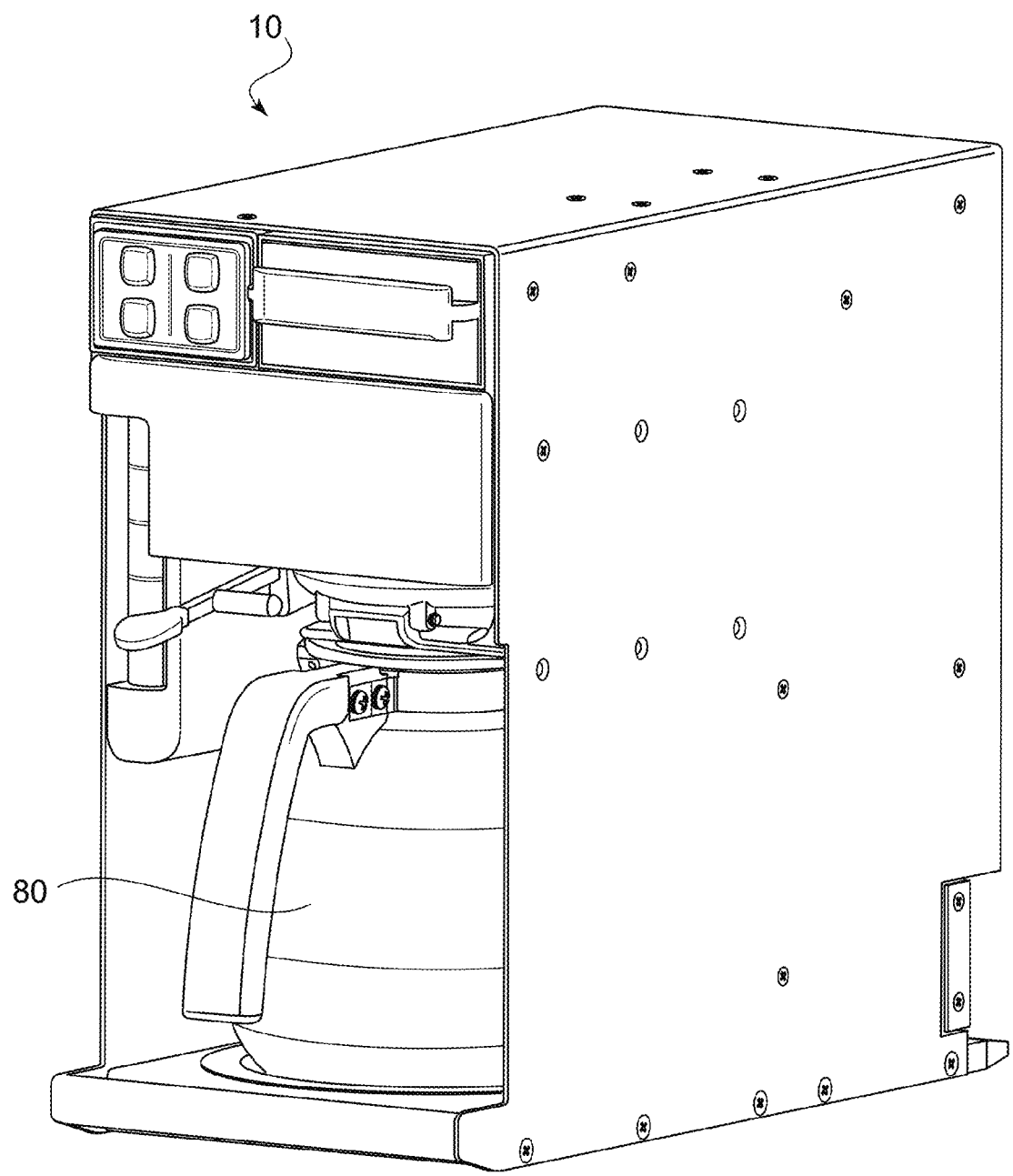
FIGS. 14-16 show various embodiments of a drip stop feature.
Figure 15:
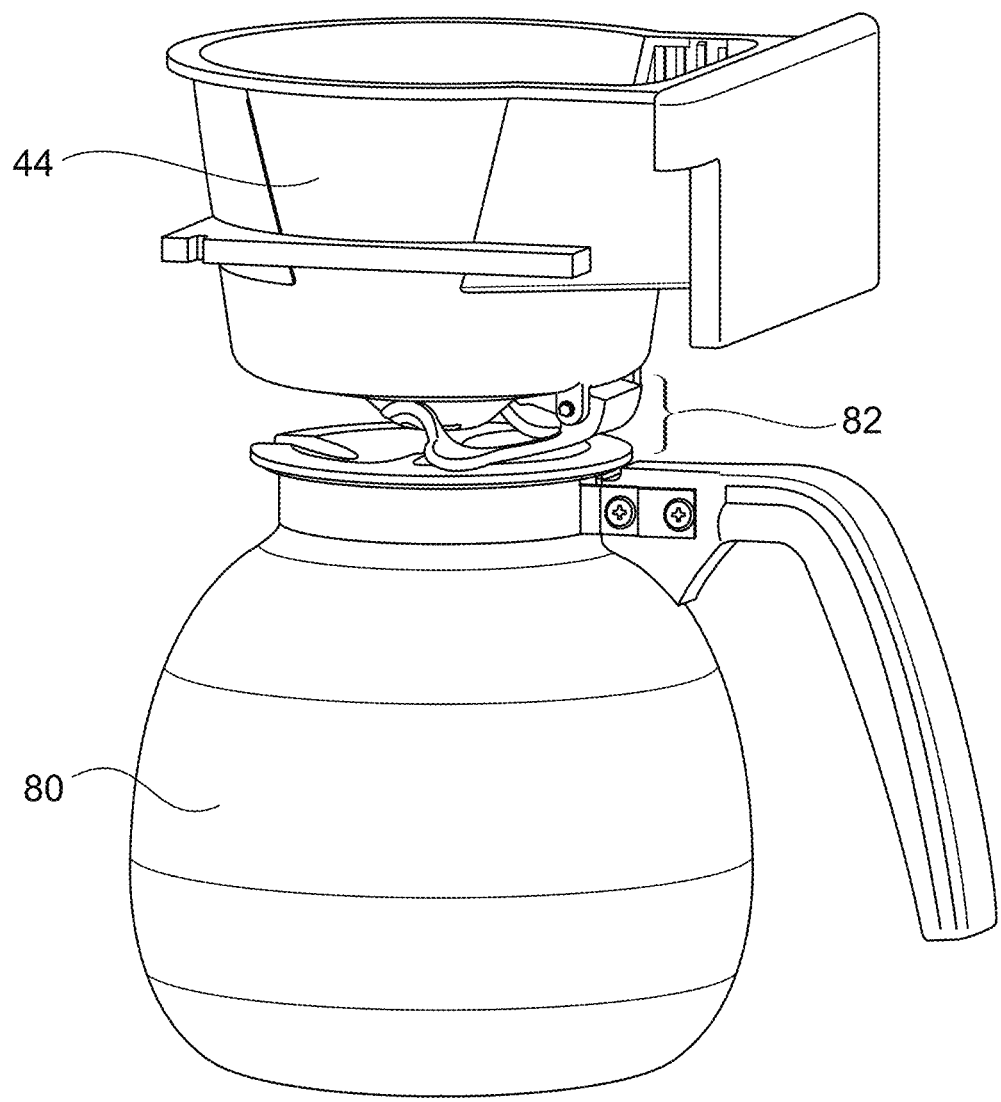
Figure 16:
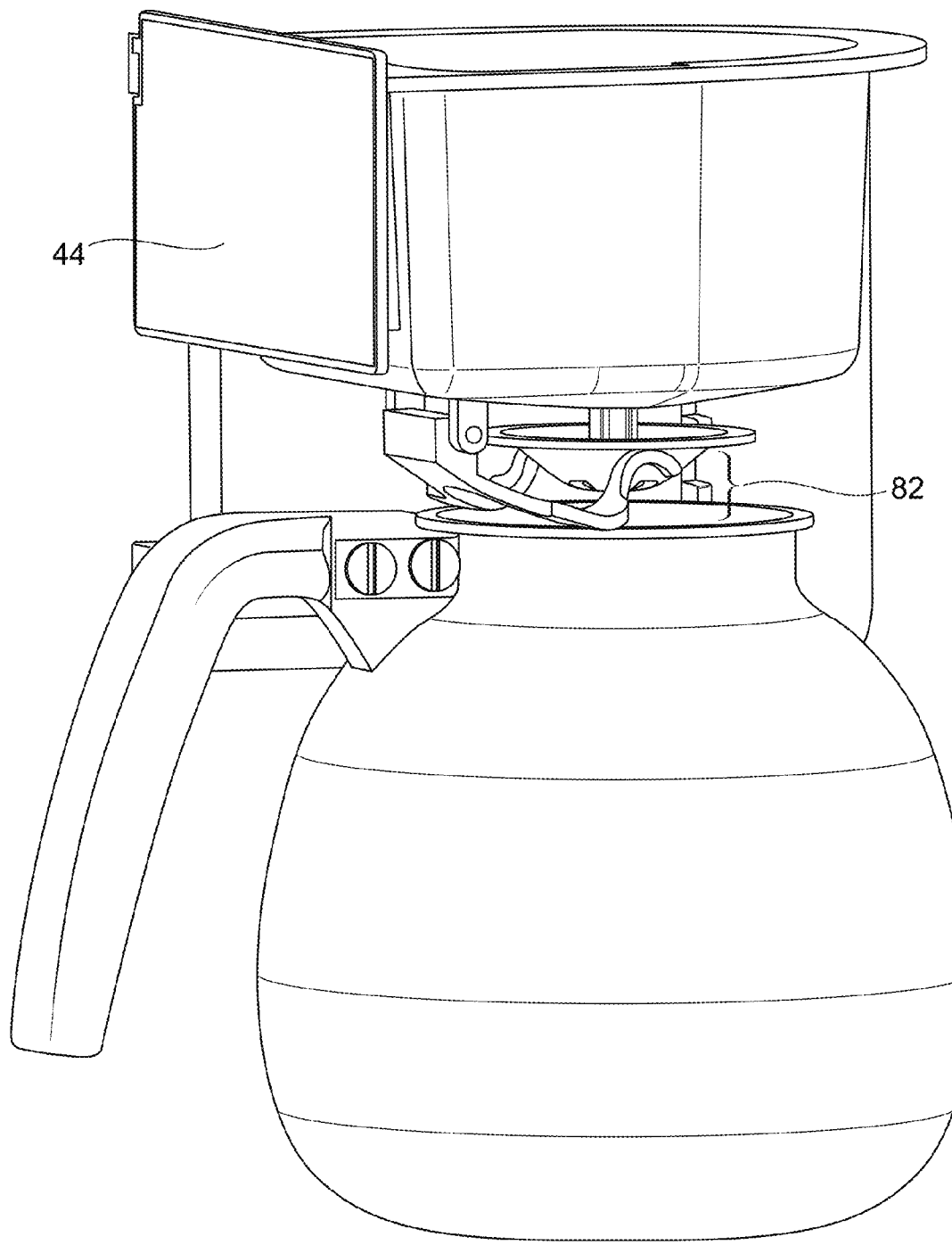

An alternate steam duct may be designed to have a heat exchanger component 64 within or mounted on the steam duct in order to condense even more air/steam that passes through the system. An example is shown in FIG. 13. A fan may also be provided in order to increase the efficiency of the heat exchanger. The heat exchanger 64 can condense the air/steam before it is delivered to the reservoir, which can help reduce the condensing load on the reservoir.

Figure 17:
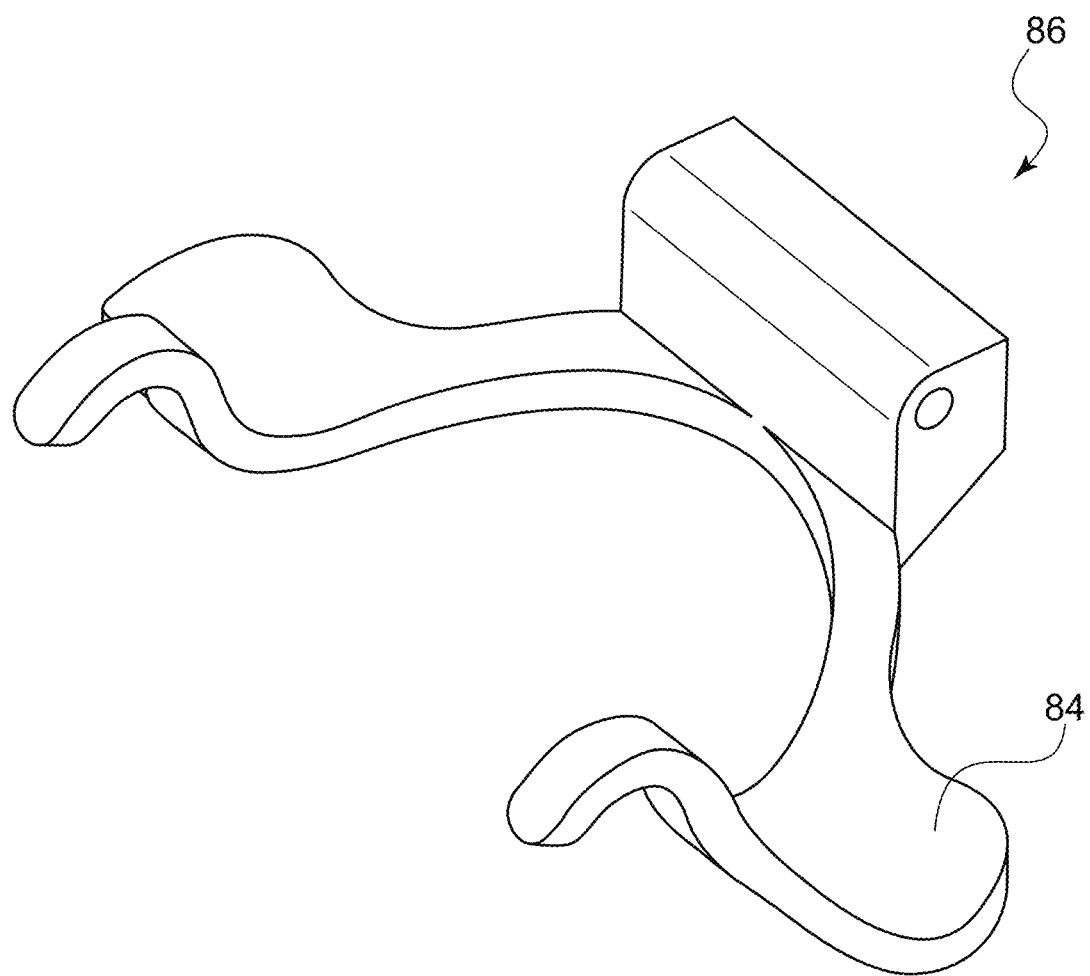
FIG. 17 shows one embodiments of a lever that may form part of a drip stop valve.

A further feature that may be provided is a drip stop feature, as shown in FIGS. 14-17 and 9-10. This feature allows a user to pull the coffee pot 80 out while the coffee maker is brewing and prevents drips. When the pot 80 is removed, a valve 82 in the coffee basket is closed, which stops the flow of coffee and prevents drips and other messes. In a specific embodiment as shown in FIG. 17, the valve 82 comprises two curved legs 84, which are mounted on a hinged element 86. Removal of the coffee pot 80 causes hinged element 86 to snap up and close the bottom portion 88 of the brew tray, as shown in FIGS. 9 and 10. Bottom portion 88 may be a separate element that is secured to brew tray by a spring 90.

The drip stop feature may work with coffee pots having lids or with coffee pots without lids, directly from catering services. These coffee pots are generally stainless steel and have a lip, raised rim, or flanged ring around the opening Drip stop valve 82 is sloped so that is acts against the rim or ring of the coffee pot if a lid is not in place.

Changes and modifications, additions and deletions may be made to the structures and methods recited above and shown in the drawings without departing from the scope or spirit of the invention and the following claims.

What is claimed is:

1. A coffee maker configured for use on board a passenger transport vehicle, comprising:
    (a) a water reservoir;
    (b) a water fill drawer that directs water poured into the drawer to the water reservoir,
    (c) a track system on which the water fill drawer cooperates,
    (d) a secure closure system for securing the water fill drawer when closed;
    (e) a coffee basket securable with respect to the coffee maker; and
    (f) a steam duct that is separate from a water delivery line that delivers water from the reservoir to the coffee basket for brewing, the steam duct mounted above and not in contact with water located in the coffee basket and the water reservoir and that traps steam built up in the coffee basket and directs the steam to the water reservoir for condensing.

2. The coffee maker of claim 1, wherein the water fill drawer comprises a grate.

3. The coffee maker of claim 1, wherein the secure closure system comprises a spring detent feature, a flat spring, or a push/push latch.

4. The coffee maker of claim 1, wherein the water fill drawer cooperates with the track system at a downward angle such that water entering the water fill drawer is directed via gravity back toward the water reservoir of the coffee maker.

5. The coffee maker of claim 1, wherein the coffee basket comprises an insert portion having an injector, such that the coffee basket is configured to brew using pre-packaged coffee bags.

6. The coffee maker of claim 1, wherein the coffee basket is secured to the coffee maker via a rotating hinge.

7. The coffee maker of claim 6, wherein the coffee basket is configured to be pulled horizontally out along a second track system and rotated sideways on the rotating hinge.

8. The coffee maker of claim 1, further comprising: a low water sensor system configured to sense a low water condition and activate a shut off feature.

9. The coffee maker of claim 8, comprising a low water float.

10. The coffee maker of claim 1, further comprising a drip stop valve comprising one or more curved levers.

11. The coffee maker of claim 1, wherein coffee basket is used in conjunction with an insert, the insert comprising an injector configured to contact a coffee bag and deliver water thereto.

12. The coffee maker of claim 1, wherein the closure system is positioned along the track system or at a rear of the coffee maker.

13. The coffee maker of claim 1, wherein the coffee basket comprises a separate insert portion having angled side surfaces and an injector positioned on a lower surface, the injector comprising a recessed water release portion, such that when the insert portion is positioned within the coffee basket, the injector presses into a pre-packaged coffee bag.

* * * * *